No. 662,768. Patented Nov. 27, 1900.
P. L. CROWE.
SPROCKET WHEEL FOR USE ON CHAIN GRATES.
(Application filed Mar. 12, 1900.)
(No Model.)
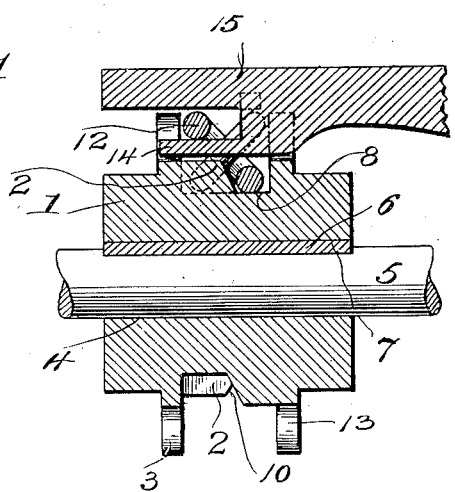
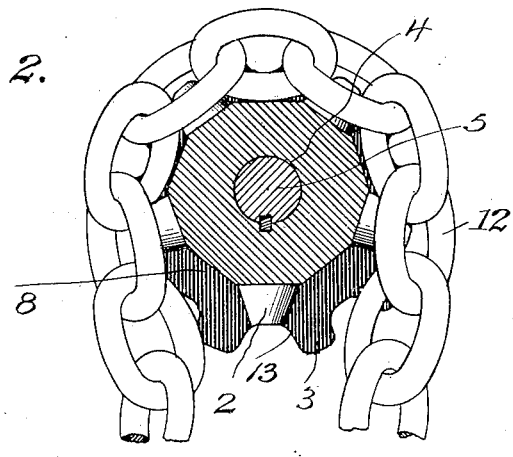
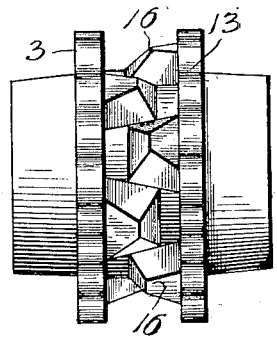
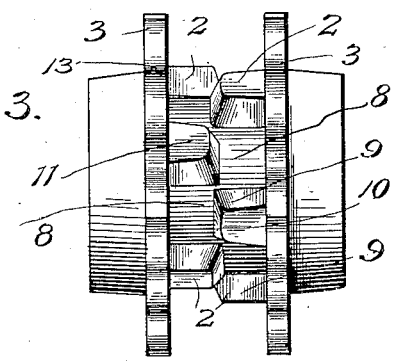
Witnesses
Fenton S. Belt,
Geo. P. Kingsbury.
Inventor
Paul L. Crowe
by Mason Frederick Lawrence
his Attorneys

UNITED STATES PATENT OFFICE.

PAUL LOUIS CROWE, OF DULUTH, MINNESOTA.

SPROCKET-WHEEL FOR USE ON CHAIN GRATES.

SPECIFICATION forming part of Letters Patent No. 662,768, dated November 27, 1900.

Application filed March 12, 1900. Serial No. 8,330. (No model.)

*To all whom it may concern:*

Be it known that I, PAUL LOUIS CROWE, a citizen of the United States, residing at Duluth, in the county of St. Louis and State of Minnesota, have invented certain new and useful Improvements in Sprocket-Wheels for Use on Chain Grates; and I do hereby declare the following to be a full, clear, and exact description of the invention, such as will enable others skilled in the art to which it appertains to make and use the same.

My invention relates to improvements in sprocket-wheels, and particularly such as are adapted for use in connection with common cable-chains.

It consists in a sprocket-wheel having a hub portion, a series of chain-engaging sprockets arranged around the periphery thereof, the sprocket upon one side being arranged opposite to the spaces between the sprockets upon the other side, and flanges upon either side of the sprockets provided with a series of depressions whereby the sprocket-wheel is adapted for use in connection with the grate-bars of a traveling chain grate.

It also consists in certain other novel constructions, combinations, and arrangements of parts, as will be hereinafter fully described and specifically claimed.

In the accompanying drawings, Figure 1 represents a vertical section through a sprocket-wheel constructed in accordance with my invention, a link of a chain and a portion of a grate-bar being shown in position upon the said sprocket-wheel. Fig. 2 represents a vertical section through the said sprocket-wheel on a plane at right angles to the axis of the wheel, a cable-chain being shown arranged upon the said wheel. Fig. 3 represents a plan view of one edge of said sprocket-wheel, and Fig. 4 represents a detail view illustrating a modified form of sprocket-tooth with which the sprocket-wheel may be provided.

My improved sprocket-wheel is designed especially for use in connection with a chain of ordinary construction—as, for instance, a common cable-chain—and it is particularly adapted for use in driving such chains when they are used for forming a traveling grate. The sprocket-wheel is also adapted for use in connection with a particular style of grate-bar, which is shown and described by me in an application filed January 31, 1900, Serial No. 3,499.

The sprocket-wheel comprises a hub portion 1, about which, near the central portion thereof, are arranged a series of sprocket-teeth, as 2 2. Upon either side of the sprocket-teeth and so as to guide the chains upon the same are arranged side flanges 3 3. The body or hub portion 1 is preferably centrally bored, as at 4, so as to fit upon a shaft, as 5, by which it is adapted to be actuated, a groove, as 6, being formed in the hub 1 to accommodate a key, as 7, for fixing the sprocket-wheel upon the said shaft. The sprocket-teeth 2 are arranged alternately upon each side of the central plane of the wheel, extending toward the said central plane from the side flanges 3 3. The teeth upon one side of the wheel are arranged opposite the spaces 8 8 upon the other side, so that the said teeth extend inwardly alternately from opposite sides. The inwardly-extending ends of the said sprocket-teeth are approximately pyramidal in form, having outwardly-inclined faces, as 9 9, upon each side and backwardly-inclined faces 10 at their inner ends. These teeth, at their outer ends, preferably abut directly upon the flanges 3 3, of which they may be in fact an integral part. The top faces 11 11 of the teeth also preferably incline downwardly from the flanges 3 toward the center of the sprocket-wheel. The bases of the sprockets preferably extend beyond the central plane of the wheel, so that the ends of the said sprocket-teeth pass each other. The teeth thus arranged form alternate spaces, as 8, upon each side of the sprocket-wheel for receiving alternate links of a chain, as 12. This chain is, as above mentioned, preferably of a common cable type, being made up of a series of loop links which are counter parts of each other. In applying such a chain to the sprocket-wheel the links preferably lie upon and incline, as seen in Fig. 1 of the drawings, with respect to the vertical plane of the wheel, one link lying diagonally in a space 8, while the next link lies diagonally at right angles thereto in the next space 8. The sprocket-teeth project into the hollow portions of the links, so that not only are the links engaged by the projecting pyramidal ends of the sprocket-teeth but the ends of each link are engaged by the side faces of the adjacent sprocket-teeth upon either side of and opposite to the one which projects into the said link.

In order to accommodate the sprocket-wheel to the style of grate-bar claimed and described by me in the application above referred to, the side flanges 3 3 are provided with a series of notches or depressions 13 13, the depressions being preferably arranged opposite each one of the sprockets and being cut sufficiently deep to be upon a plane with the top surfaces 11 of the said teeth. The notches or recesses 13 thus formed in the peripheries of the flanges 3 3 are adapted to accommodate chain-engaging hooks, as 14, formed upon the under side of the grate-bars, as 15. These hooks extend into the links of the chain 12, so as to be carried along by the said chain and yet because of the construction of the sprocket-wheel do not interfere with the actuation of the said chain by means of the said sprocket-wheel. This forms a particularly desirable construction I find for driving a traveling grate and one which is not only simple but exceedingly strong. The hub 1 of the sprocket-wheel preferably extends a sufficient distance to each side of the flanges 3 3 to form a very strong wheel and one which can be securely fastened to an actuating-shaft.

As seen in Fig. 4 of the drawings, the shape of the sprocket-teeth may be varied without departing in the least from the spirit of the present invention. In said Fig. 4, for instance, I have shown the teeth having a pyramidal form, which is very much sharper at the corners 16 than as above described and illustrated. It would be apparent also that I might vary the shape of the teeth, as well as of the other parts of the sprocket-wheel, all within the scope of the present invention.

Having thus described the invention, what is claimed, and desired to be secured by Letters Patent, is—

1. A sprocket-wheel comprising a body portion forming a hub, a series of alternately-arranged link-engaging sprocket-teeth, flanges upon each side of said teeth for limiting a chain which may engage the said wheel, the said sprocket-teeth having an approximately pyramidal form so as to extend into the links of a chain and also to embrace the said links between each pair of the teeth for actuating the said chain.

2. A sprocket-wheel comprising a hub portion, a series of sprocket-teeth arranged alternately upon each side of the wheel so as to project into the links of a chain from opposite sides, flanges formed outside the teeth, said flanges having a series of peripheral depressions or recesses for accommodating attaching means upon grate-bars when the said wheel is used for driving a traveling grate.

3. A sprocket-wheel comprising a hub portion, a series of pyramidal sprocket-teeth arranged upon each side of the central plane of the wheel, the side and end faces of the said teeth slanting toward each other from the base of the teeth, and the ends of the teeth upon opposite sides extending slightly past each other, flanges arranged upon each side of the teeth, said flanges having peripheral notches for engaging grate-bars when the wheel is used to drive a traveling chain grate, the construction being such that the links of an ordinary chain may be engaged by the pyramidal teeth, the teeth extending into the said links and each adjacent pair of teeth embracing the ends of the said links for firmly engaging the chain when driving it, substantially as described.

In testimony whereof I hereunto affix my signature in presence of two witnesses.

PAUL LOUIS CROWE.

Witnesses:
JAMES T. WATSON,
PHINEAS AYER.